United States Patent Office 3,316,286
Patented Apr. 25, 1967

3,316,286
POLYISOCYANATE COMPOSITIONS AND
PREPARATION THEREOF
Melvin Kaplan, Tonawanda, N.Y., assignor to Allied
Chemical Corporation, New York, N.Y., a corporation
of New York
No Drawing. Original application Sept. 24, 1962, Ser.
No. 225,873, now Patent No. 3,215,652, dated Nov. 2,
1965. Divided and this application Apr. 28, 1965, Ser.
No. 451,660
3 Claims. (Cl. 260—453)

This invention relates to polyurethane cellular material and more particularly refers to a new and improved process for producing rigid polyurethane foams and to polyisocyanate compositions useful for making such foams.

This application is a divisional application of my copending application Ser. No. 225,873, filed Sept. 24, 1962 and now Patent No. 3,215,652, which is a continuation-in-part of my application, Ser. No. 49,128, filed Aug. 12, 1960, and now abandonded.

In the manufacture of polyurethane cellular materials, it is well known to react a polyfunctional, active hydrogen containing polyester, polyesteramide or polyether with an organic polyisocyanate. Foamed products can be obtained by carrying out his reaction in the presence of a blowing agent e.g. carbon dioxide produced by the reaction of excess polyisocyanate with water or a halogen substituted alkane which is volatilized by the heat generated in the polymerization reaction. When employing polyethers as the source of active hydrogen, it is considered necessary to prereact a polyol with diisocyanate to produce a prepolymer or quasi-prepolymer which is subsequently reacted with additional polyol during the foaming reaction. Foams made by the "one-shot" procedure (simple mixing of polyether polyol, tolylene diisocyanate and additives in the presence of a blowing agent) have heretofore been unsatisfactory as to dimensional stability.

An object of the present invention is to provide a "one-shot" process for the preparation of polyether-polyisocyanate foams. Another object of the present invention is to provide a process for the preparation of rigid urethane foams characteried by a combination of outstanding properties (low thermal conductivity, high compression strength, and dimensional stability) making them eminently suitable for industrial thermal insulation applications. A further object of the present invention is to provide the polyisocyanate composition characterizing the subject process, and to provide for preparation of such a composition from tolylene diamine by phosgenating the diamine and distilling the phosgenation product according to the procedure hereinafter detailed. Other objects and advantages will be obvious from the following description of my invention.

I have found that rigid polyurethane foams having superior physical properties can be obtained by reacting, in the presence of a blowing agent, a polyether containing a plurality of hydroxyl groups with a tolylene diamine phosgenation product comprising a toluene diisocyanate solution of congeneric non-volatile polyisocyanate solutes, said solution being characterized by the following combination of parameters:

(1) A weight concentration of hexane-insoluble congeneric solute between 20 and 55%;
(2) An infra-red absorption spectrum including absorbance maxima in the regions 4.3 to 4.5 microns, 5.8 to 5.9 microns and 5.95 to 6.05 microns, which define an absorbance pattern characteristic of said solute;
(3) A molar concentration of congeneric solute, sufficient to impart to said spectrum, at the absorbance maximum between circa 5.8 and 5.9 microns, an absorbance between 0.2 and 0.5 when measured by the herein defined specific procedure;
(4) An amine equivalent between 98 and 120;
(5) A recoverable tolylene diisocyantate content, as determined in a gas chromatograph, between about 55 and 85 weight percent;
(6) A viscosity between 20 and 10,000 cps. at 25° C.;
(7) A density between 1.23 and 1.29 at 25° C.

Preferably, said solution is further characterized by the presence of from 10 to 40 weight percent of non-volatile solutes which precipitate from the solution when diluted with hexane-toluene mixture according to the hereinafter described specific procedure, the precipitate solute being characterized by the following properties:

thermal stability below 130° C.
average molecular weight above 640
average amine equivalent above 180.

The reactant polyisocyanate composition characterizing the present invention is a tolylene diamine phosgenation product which may be prepared by a process comprising the following steps:

(1) Mixing tolylene diamine, phosgene and solvent at between about −20° C. and 100° C. in such proportions that the molar ratio of phosgene to tolylene diamine is at least 2.2 (preferably between 2.3 and 6) and the weight ratio of tolylene diamine to solvent is between about 0.05 and 0.50 (preferably between about 0.1 and 0.3) said solvent having a relative volatility vs. tolylene diisocyanate at 140° C. of at between 4 and 100, preferably between 8 and 50.

(2) Heating the reaction mixture through a temperature range between the mixing temperature and a maximum temperature between 100° C. and 200° C. at a super-atmospheric pressure sufficient to maintain a stoichiometric excess of phosgene in the reaction medium until the phosgenation reaction is substantially complete.

(3) Separating phosgene and hydrogen chloride from the resulting solution of phosgenate.

(4) Distilling solvent and tolylene dissocyanate from said solution of phosgenate until the residual concentrated distilland comprises a tolylene diisocyanate solution of congeneric non-volatile solute characterized by the above specified parameter combinations relating to infrared spectra, hexane-insoluble solute concentrations, amine equivalent, recoverable tolylene diisocyanate content, viscosity and density.

(5) Terminating the distillation and recovering the concentrated distilland.

The use of this reactant polyisocyanate composition to obtain superior rigid polyurethane foams from polyethers by a "one-shot" method is surprising since reaction of such reactant polyisocyanate composition with polyesters generally results in inferior brittle foams subject to collapse before setting and having a nonuniform cell structures. Also, tolylene diisocyanate alone is not suitable for use in the manufacture of polyether-type rigid foams save by the intermediate conversion of the diisocyanate into a prepolymer or quasi-prepolymer.

PREPARATION OF POLYISOCYANATE COMPOSITION

To prepare the polyisocyanate composition of the present invention, it is essential to phosgenate the tolylene diamine in the presence of a solvent which has a substantially higher vapor pressure than the tolylene diisocyanate corresponding to the diamine charge so that the solvent may be distilled from the phosgenate or else the concentrated distilland would be a solvent solution of congeneric solute rather than the desired tolylene diisocyanate solution of congeneric solute. The relative volatility of the solvent vs. the tolylene diisocyanate product corresponding to the tolylene diamine charge should be between 4 and 100 at 140° C. The relative volatiles at 140° C. of dichlorobenzene, monochlorobenzene and benzene vs. a tolylene diisocyanate mixture containing 80%, 2,4-isomer and 20% 2,6-isomer are about 11, 43 and 87 respectively. Solvents having a relative volatility below 4 are undesirable because distilling them from the phosgenate involves an excessive amount of heating having an undesirable effect on the concentrated distilland. Solvents having a relative volatility higher than 100 are undesirable because excessively high pressures are required to contain them within the reaction system. By relative volatility is meant the ratio $V_s L_i / V_i L_s$ where $V_s$ and $V_i$ represent the mol fractions of solvent and isocyanate in the vapor phase and $L_s$ and $L_i$ represent the mol fractions of solvent and isocyanate in the liquid phase under equilibrium conditions.

The solute concentration of the tolylene diamine phosgenation product may be increased or decreased as desired by increasing or decreasing, respectively, one or more of the following: amine/solvent ratio, amine/phosgene ratio; ortho diamine content of the tolylene diamine reactant charge; temperature and duration of heating during reaction and distillation, and amount of tolylene diisocyanate distilled from the phosgenation product.

In batch operation it is convenient to mix the reactants by adding a solution of tolylene diamine to a solution of phosgene under substantially atmospheric pressure conditions. Cooling is applied during the mixing operation to prevent excess phosgene from boiling away. Generally, the mixing temperature should be kept below about 30° C. Mixing temperatures below —20° C. are undesirable because excessive amounts of tolylene diamine precipitate out as solid masses which become encapsulated with a protective layer of amine hydrochloride. Such solid, encapsulated amine will melt and react at higher process temperatures under conditions of high local amine concentration which favor formation of excessive amounts of by-product ureas.

During the mixing operation, about 50% of the total phosgene consumed by the process is reacted to form an intermediate reaction product wherein the amine groups in the tolylene diamine reactant are converted, predominantly, into approximately equal numbers of amine hydrochloride groups and carbamyl chloride groups. At higher temperature levels, the carbamyl chloride groups decompose thermally to form isocyanate groups and HCl and amine hydrochloride groups react with phosgene to form the same products.

In batch processing, it is desirable to keep the mixing temperature low because the ability of the solvent to contain the total phosgene is temperature limiting. In continuous processing, higher mixing temperatures may be used because the solvent need only contain that amount of phosgene which is in excess of the phosgene consumed in forming the intermediate reaction product, i.e. the amine hydrochloride-carbamyl chloride mixture. However, the mixing temperature should be kept below 100° C. because mixing at such high temperatures results in the decomposition of carbamyl chloride groups to free isocyanate groups which react with the tolylene diamine charge to form excessive amounts of urea-type by-products.

After the mixing operation is complete, the reaction mass is further heated until the phosgenation reaction is completed, the maximum temperature being between 100° C. and 200° C. Heating causes (1) decomposition of carbamyl chloride groups to isocyanate groups and HCl at temperatures above about 40–45° C. and (2) phosgenation of amine hydrochloride groups to isocyanate groups and HCl at temperatures above about 80–85° C. The progress of the reaction may be followed by measuring the amount of HCl evolved from the reaction mass. Such measurements indicate that 60–70% of the free amine groups in the tolylene diamine charge are converted to isocyanate groups at temperatures below 100° C. The phosgenation reaction is considered complete when HCl stops evolving from the reaction mass at an appreciable rate.

To obtain the polyisocyanate compositions characterizing the present invention, the reaction mass is heated at a superatmospheric pressure sufficient to maintain a stoichiometric excess of phosgene in the reaction medium, i.e. an amount of phosgene in excess of that which is chemically equivalent to the incompletely converted intermediate reaction product which is present in the reaction mass at a given time. In other words, the reaction mass will contain part of the excess phosgene charged to the reactor at the end of the phosgenation.

Pressure levels required to complete the phosgenation will depend on the composition of the reactant charge and type of reactor used. In a closed reactor, pressure will continually increase as the reaction proceeds because hydrogen chloride evolves during the reaction at a reaction temperature higher than the critical temperature (51.4° C.) of the hydrogen chloride. The magnitude of this pressure increase will depend in large part on the relative volume of free space in the reactor, i.e. on the percent reactor capacity occupied by the reaction mixture. The pressure developed by HCl evolution can thus be minimized to any desired degree by providing a large enough free space. Alternatively, the total pressure level can be minimized by using a vented reactor to pass evolved hydrogen chloride to a scrubber system while containing the phosgene and solvent. In such a vented reactor, the pressure vessel is surmounted by a reflux condenser which returns a solvent-phosgene condensate to the reactor while passing HCl to an effluent gas line leading to a scrubber system. Pressure on the system is controlled by a valve in the gas line downstream from the reflux condenser. If the valve pressure is higher than the sum of the partial pressures of the solvent, phosgene and isocyanate in the reactor, these components of the reaction mass will be effectively contained in the reaction system. The total pressure required will depend in part on the volatility of the solvent selected. Thus results obtainable at a pressure of about 3 atmospheres using a relatively non-volatile solvent like dichlorobenzene would require 6–8 atmospheres if benzene or similar solvent of relatively high volatility were used. In general, the process of the present invention may be effectively carried out at total pressures above 3 atmospheres. Maximum pressure levels are determined by consideration of equipment cost and safety hazards.

The phosgenation reaction is considered complete when HCl gas ceases to evolve at an appreciable rate. If a closed system is used, the pressure therein at constant temperature, will no longer increase when HCl evolution ceases. In a vented autoclave, it will be necessary to close the pressure relief valve in order to maintain pressure in the autoclave when HCl evolution ceases. When the reaction is complete, the autoclave is vented to atmospheric pressure. The reaction mass is then purged to remove dissolved phosgene and HCl—, e.g. by passing inert gas (nitrogen or carbon dioxide) through the mass, or by a purging distillation which removes HCl and phosgene together with some solvent.

The resulting solution of phosgenate is then distilled to remove solvent and tolylene diisocyanate until the concentrated distilland has a composition within the range specified by the above-given parameter combinations. Distillation is then terminated and the product is packed out. In practice it is usually adequate to determine the stage at which distillation should be terminated by measuring the amine equivalent of the concentrated distilland.

Preferably the crude phosgenation product is distilled under vacuum. Solvent should be removed substantially completely together with other low-boiling components such as traces of monoisocyanates. Traces of solvent (e.g. concentration of dichlorobenzene above 0.02%) in the phosgenation product may impart an undesirable odor to urethane foams made therefrom. Some tolylene diisocyanate is distilled off with the removal of solvent and low boiling impurities. If the concentration of congeneric solute in the tolylene diamine phosgenation product is higher, this may be all the distillation that is required. However, if the process and equipment are also to be used for making substantial amounts of pure tolylene diisocyanate, the yield thereof will be low if process conditions are selected to give a high concentration of congeneric solute. It is preferred to use process conditions giving a lower concentration of congeneric solute in the phosgenate and distill off considerable tolylene diisocyanate from the phosgenate to obtain a concentrated distilland of the desired properties. Such tolylene diisocyanate distillate, which may amount to as much as 50 weight percent of the total phosgenation product, is a valuable by-product of the process. The composition and properties of the concentrated distilland will be affected to some extent by distillation conditions. The solute concentration can be increased, if desired, by subjecting the distilland to higher temperature levels and/or longer heating periods during distillation. Such increase in solute concentration can be minimized by use of lower temperature levels and/or shorter heating periods during distillation, i.e., by distilling at lower absolute pressure.

Distillands more concentrated that those defined by the above listed properties may be prepared and diluted with tolylene diisocyanate to obtain compositions with the above-defined properties. However, it is not advisable to carry the distillation too far because complex decomposition, polymerization and depolymerization reaction occur at the high temperatures and high solute concentrations characterizing such distillation conditions, as evidenced by rapid increases in the viscosity of the distilland, evolution of gases causing loss of vacuum, thereby making it necessary to increase the still temperature, and changes in the infrared spectrum of the distilland.

ANALYTICAL PROCEDURES

Infrared absorption spectrum

Products of the present invention are characterized by infrared spectra which include absorption maxima at 4.3 to 4.5 microns, 5.8 to 5.9 microns and 5.95 to 6.05 microns. Spectra are suitably run in chloroform solution containing circa 5% sample, the chloroform spectrum being neutralized by running the sample vs. a chloroform reference standard in a matched pair of cells. It is essential that chloroform or other solvents used be substantially free from alcohol or other additives or impurities containing reactive hydrogen which would react with isocyanate groups in the sample.

The absorption maximum at 4.3 to 4.5 microns is characteristic of —NCO groups and occurs in the spectra of pure tolylene diisocyanate, the congeneric solutions of the present invention, and solute fractions isolated therefrom.

The absorption maxima at 5.8 to 5.9 and 5.95 to 6.05 microns do not appear in the spectrum of pure tolylene diisocyanate or tolylene diisocyanates made by various prior art processes, but do appear in the spectra of the congeneric solutions of the present invention and solute fractions isolated therefrom.

Polyisocyanate compositions characterizing the present invention show an absorbance between 0.2 and 0.5 at 5.85 microns when measured by the following specific procedure: (1) record the spectrum of the chloroform solvent, using a cell of 0.1 mm. path length, in the region of 5. to 6.5 microns; (2) prepare a chloroform solution of the sample having a concentration of 5 g. sample per 100 ml. chloroform; (3) run the curve of the sample vs. the chloroform reference standard in a matched pair of cells having a cell length of 0.1 mm., on the sheet containing the previously recorded curve for the solvent, in the region of 5. to 6.5 microns at the same instrument settings as were used to record the curve of the solvent. The absorbance of the sample is given by the term log $I_0/I$ where $I_0$ and $I$ are the beam intensities (or "percent transmittances") of the solvent and sample, respectively, at 5.85 microns. A Baird Infrared Spectrophotometer, Model 455, using NaCl optics, or similar instrument, should be used.

The absorbance at circa 5.85 microns is, in accordance with Beer's Law, proportional to the molar concentration of congeneric solute in the sample.

Isocyanate equivalent weight or "amine equivalent"

Isocyanate equivalent weights are measured by an analytical procedure which involves reacting the isocyanate groups in the sample with n-dibutyl amine to form the corresponding urea groups and back titrating excess n-butylamine with HCl solution. The procedure is as follows: weigh 6 to 8 grams of sample, dilute with 35–50 cc. of cp. toluene, add 20 cc. of a 2 N solution of dibutylamine in cp. toluene, heat 5 to 10 minutes (do not boil), cool, add 100 cc. methanol, titrate with 1 N HCl solution to an end point pH of 4.2 to 4.5 using a pH meter, run a blank. The results may be calculated as either weight percent NCO group in the sample or as so-called "amine equivalent," i.e., the weight of sample containing 1 equivalent weight (42 grams) of NCO group. The applicable equations are $$\text{percent NCO} = 4.2(TB-TS)N/WS$$

$$AE = \frac{1000\ WS}{(TB-TS)N}$$

wherein $AE$ = amine equivalent
$WS$ = weight of sample in grams
$TB$ = titration of blank in ml. HCl
$TS$ = titration of sample in ml. HCl
$N$ = normality of HCl The range of amine equivalents for products of the present invention is 98 to 120, particularly 102 to 108. The amine equivalent of pure tolylene diisocyanate is 87. Polyisocyanate solute isolated from the products may have equivalent weight of over 200.

DETERMINATION OF TOTAL RECOVERABLE TOLYLENE DIISOCYANATE

Polyisocyanate compositions characterizing the present invention contain about 20% to 55% total nonvolatile congeneric solute and about 45 to 80% tolylene diisocyanate solvent. The amount of tolylene diisocyanate solvent cannot be accurately determined by distillation because, during the latter stages of distillation, compounds in the solute fraction decompose thermally to liberate free tolylene diisocyanate, leaving behind residues of a tarry, plastic or coke-like character. Thus the total tolylene diisocyanate recovered by distillation is greater than the tolylene diisocyanate present as solvent in the solution. Nevertheless, the percent total tolylene diisocyanate recoverable from the solution is a useful parameter for characterizing the solution. The percent total recoverable tolylene diisocyanate in the solution is preferably measured in a gas chromatograph because results are more accurate and reproducible than those obtained by distillation analysis.

Gas chromatograph data herein reported were made in a Perkin Elmer Model 188 Triplet Stage Vapor Fractometer using a vaporizer temperature of 250° C., "Fluoropak 80" column packing coated with silicone grease as a partition agent, and helium gas as an effluent. The analysis was carried out using trichlorobenzene as an internal standard. Chromatograph charts are obtained for two samples: (1) a reference mixture of tolylene diisocyanate and trichlorobenzene of known composition, and (2) a mixture of unknown and trichlorobenzene having a known trichlorobenzene content. The samples are introduced into the vaporizing chamber via a syringe and have a volume (which need not be measured) of one microliter or less. The ratio of sample sizes A introduced into the fractometer is determined from the chromatographs by the expression:

$$A = \frac{\text{Peak height trichlorobenzene in reference}}{\text{Peak height trichlorobenzene in unknown}}$$

The ratio of tolylene diisocyanate concentrations in reference sample and unknown, B, is determined from the chromatographs by the expression:

$$B = \frac{\text{Peak height tolylene diisocyanate in unknown}}{\text{Peak height tolylene diisocyanate in reference}}$$

The percent tolylene diisocyanate in the unknown is then given by the product ABC where C is the percent tolylene diisocyanate in the reference standard.

Polyisocyanate compositions characterizing the present invention have recoverable tolylene diisocyanate contents between 55% and 85% when measured by this procedure or equivalent.

ISOLATION OF SOLUTES AND SOLUTE FRACTIONS

The non-volatile solute fraction of the polyisocyanate compositions of the present invention may be isolated as a filterable solid by the following procedure: cover a 6 gram sample in a large bottle with 360 ml. of n-hexane (e.g. "Skellysolve B"). Shake the bottle for 10 minutes in a shaking machine such as is used to homogenize the contents of paint cans, allow the dispersed solids to settle out; decant the extract and centrifuge the decantate to separate solids which are returned to the bottle; repeat the extraction using about 250 ml. hexane; filter the resulting suspension to isolate the solutes; dry in a vacuum oven at 50° C. This procedure avoids separating out the solute as a tar, containing occluded tolylene diisocyanate, which sticks to surfaces and cannot be filtered or worked up with satisfactory results.

A large part of the solute fraction present in the polyisocyanate composition may be readily separated by the following procedure: dilute a 2 gram sample with a mixture of 6 ml. toluene and 50 ml. of n-hexane (e.g. "Skellysolve B"), stir, isolate the precipitate on a sinter glass filter, wash it with n-hexane and dry it in a vacuum oven at 50° C. This procedure isolates a fraction of the total solute which is higher in molecular weight and melting point than the remainder.

CHEMICAL NATURE OF POLYISOCYANATE COMPOSITION

Polyisocyanate compositions characterizing the present invention contain from 20 to 55 wt. percent of total hexane-insoluble solutes and from 10 to 40% of hexane-toluene insoluble solutes isolatable by the above-described procedures. The solutes are essentially non-volatile and decompose thermally in the molecular still at pressures of circa 1-2 mm. Hg and temperatures of circa 225° C. to yield circa 20–30 wt. percent of tolylene diisocyanate, which vaporizes off and may be recovered. Solid residues remaining after pyrolysis are of a granular character in the case of hexane-toluene insoluble solutes and of a fused plastic character in the case of hexane-insolubles.

The solutes are polyisocyanates of higher functionality and molecular weight than tolylene diisocyanate. When the compositions are used, the solutes crosslink or extend polymer chains and impart desirable properties (particularly rigidity) to the foams. Although present knowledge of the molecular structure of the solutes is incomplete and inconclusive, it appears that the structures include isocyanato substituted tolylene groups jointed by linkages including amido-substituted carbonyl groups which absorb infrared radiation of wave-lengths between 5.8 and 5.9 microns. However, data on the isocyanate equivalent weights of solutes and solute fractions establish that the solutes do not consist of such simple polycarbamide polyisocyanates as bis(isocyanatotolyl urea), bis(isocyanatotolyl) uretidinedions, trisisocyanatocyanurates or trisisocyanatotolyl biuret or similar linear polyurets.

The following table sets forth data on solutes isolated from the polyisocyanate composition described in Example 1, below.

| | Hexane Insolubles | Hexane-Toluene Insolubles |
|---|---|---|
| Weight percent | 35.1 | 22.2 |
| Amine Equivalent | 177.4 | 182.1 |
| Molecular Weight | 600 | 661 |
| Thermal Stability, ° C.: | | |
| Discolors | 110 | 150 |
| Softens | 115 | [1] 160–165 |
| Melts | 125 | |

[1] Tarry.

Preferred polyisocyanate compositions of the present invention contain from 10 to 40% of toluene-hexane insolubles separable by the above procedure, said insolubles being further characterized by thermal stability below 130° C., average molecular weights above 640, and average amine equivalents above 180.

Knowledge of the molecular structure of the solutes is not necessary to enable one to practice the invention with full realization of its advantages. Compositions operative to provide these advantages may be characterized by the above-listed parameter combinations relating to infrared absorption spectra, weight percent hexane insolubles, amine equivalent, recoverable tolylene diisocyanate content, viscosity and density. These parameters distinguish the subject compositions from phosgenation products which are too dilute with respect to solute concentration, too concentrated with respect to solute concentrations and prepared by different phosgenation processes.

*Physical properties of polyisocyanate compositions*

The properties of the polyisocyanate compositions of the present invention provide many advantages in use.

Vapor pressures of the compositions are much lower than the vapor pressure of pure tolylene diisocyanate; this is a safety advantage because tolylene diisocyanate vapors are toxic. Freezing points of the composition are lower than the freezing point of tolylene diisocyanate, which facilitates storage and handling problems during winter.

Viscosity of the compositions ranges from 20 to 10,000 cps. at 25° C. and is preferably about 50–70 cps., whereas the viscosity of pure tolylene diisocyanate is about 3 cps. The higher viscosity level makes it easier to mix the polyisocyanate composition with polyether reactants and forms a reactant mixture of higher viscosity which better retains the blowing agent during foam formations. The high viscosity also minimizes splashing.

Foam forming reactions between the polyisocyanate compositions of the present invention and polyether polyol reactants develop less heat of reaction than do comparable reactions between polyether polyol and tolylene diisocyanate, so that the reaction temperature is lower by 20° to 30° C. This permits the production of larger foamed masses and improved properties of the foam.

FOAM PRODUCTION

Foams are most advantageously prepared simply by mixing the polyisocyanate component with a mixture containing the polyether component, a blowing agent or blowing agent precursor, and various additives such as catalysts, cross-linking agents, emulsifiers and dispersing agents, colorants, etc. Suitably the mixture and polyisocyanate are mixed in a conventional mixing machine, designed for foam formulations, which discharge the mixture into a mold or directly into the space to be filled. The foam expands upon standing and may be cured by heating to the required extent.

The amount of polyisocyanate composition used to react with the polyether and other active hydrogen containing substances can be varied over a wide range depending upon the character and properties of foamed product desired. Thus improved rigid polyurethane foams utilizing fluorocarbon blowing agents will require lesser amounts of the isocyanate component than those in which carbon dioxide is utilized as the blowing agent. At least one equivalent of NCO groups is used per equivalent of active hydrogen containing substance present. Preferably, about 1.03 to 1.05 NCO equivalents should be used for each equivalent of —OH group. In general the excess of isocyanate groups used will not exceed an amount of 20% more than the stoichiometric requirement based on the amount of active hydrogens supplied by the polyether or other active hydrogen containing component.

BLOWING AGENT

Examples of blowing agents for use in the present invention include carbon dioxide (produced by reaction of water and the diisocyanate) and fluorinated aliphatic saturated hydrocarbons as well as mixtures of these agents. The preferred blowing agent for the purposes of the present invention is one or can be a mixture of the group of compounds exemplified by the following particular members: monofluorotrichloromethane; dichlorodifluoromethane; monochlorotrifluoromethane; trichlorotrifluoroethane; dichlorotetrafluoroethane; tetrachlorodifluoroethane; 1,1-difluoroethane; 1,1,1-chlorodifluoroethane. These fluorinated aliphatic blowing agents are characterized by being liquids or gases at normal temperatures and pressures, poor solvents for the organic polymer, and boiling at temperatures below that generated by the polyurethane formation reaction. They, preferably, have significant solubility in the tolylene diisocyanate compositions and when in the gaseous state have a molecular size such that they do not readily diffuse through the interstices of the polyurethane molecules at ambient temperatures.

POLYETHER POLYOL REACTANTS

Polyethers, containing a plurality of hydroxyl groups, suitable for reaction with the tolylene diisocyanate solution to produce the improved polyurethane rigid foams are polyfunctional compounds believed to have the general formula

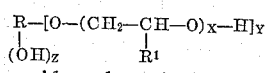

wherein R is the residue of a polyol as exemplified below; $R^1$ is H, —$CH_3$ or phenyl; X is an integer from 1 to 5; Y is an integer from 1 to 10; and Z is 0 or an integer from 1 to 9. Preferably these compounds have from three to ten hydroxyl groups reactive with NCO groups and have a hydroxyl number in the range of from about 200 to about 750, preferably 370 to 620. Such polyethers are obtained by condensation of an alkylene oxide, such as ethylene oxide, propylene oxide, styrene oxide, or mixtures of these alkylene oxides with polyhydric alcohols and/or polyhydric phenols in the presence of suitable basic catalysts, such as trialkylamines, e.g., trimethylamine or inorganic bases, e.g., KOH. The polyols, that is polyhydric alcohols or polyhydric phenols, suitable for producing the preferred polyethers include, for example, glycerol, trimethylol propane, hexanetriol, fructose, hexitol, sorbitol, maltose, sucrose, triphenylolethane, tetraphenylolethane, triphenylolpropane, resorcinol, pyrogallol, bisphenol A (2,2-bis (4-hydroxyphenyl) propane), chlorinated diphenol, mixtures of the above compounds and mixtures of these compounds with water. (Polyethers corresponding to these types are described in U.S.P. 2,902,478; U.S.P. 2,928,918 and Belgian P. 584,738.)

In accordance with conventional practices for producing polyurethane foams the tolylene diisocyanate composition and polyether containing a plurality of hydroxyl groups are reacted in the presence of various additives, such as blowing agents, activators or catalysts, and dispersing agents or emulsifiers.

CATALYSTS AND ACCELERATORS

Examples of compounds for use as accelerators or catalysts include (1) conventional tertiary amine catalysts, such as triethylamine, N-methylmorpholine, triethylenediamine, N,N,N',N'-tetramethyl-1,3-butanediamine; (2) tertiary amines containing hydroxyl groups and capable of crosslinking the polyurethane, that is compounds of the general formula

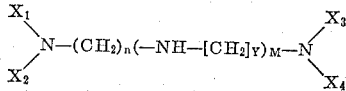

wherein $X_1$, $X_2$, $X_3$ and $X_4$ can be the same or different and are represented by the group H-(O-alkylene)$_Z$ in which Z is from 1 to 4, alkylene means a divalent aliphatic saturated hydrocarbon radical containing from 1 to 10 C atoms, also one of $X_1$, $X_2$, $X_3$ and $X_4$ can be an alkyl group containing up to 20 C atoms; n is an integer from 1 to 10, preferably 2 or 3; M is 0 or an integer from 1 to 3; and Y is an integer from 1 to 10; such compounds include tetra(hydroxyethyl)ethylenediamine; tetra(hydroxypropyl)ethylenediamine, condensation product of propylene oxide and di(ethylenediamine) and N-coco-N,N',N'-tri(hydroxyethyl)ethylenediamine; and (3) organic compounds containing tin such as tin hexanoate, tri-n-butyltin acetonate, bis(2-ethylhexyl)tin oxide, di-n-butyltin diacetate, di-n-butyltin dilaurate, di-n-butyltin dichloride and di-n-butyltin di(2-ethylhexanoate). These catalysts and/or accelerators can be used alone or mixtures of one or more of the three types can be utilized.

EMULSIFIERS AND DISPERSING AGENTS

Examples of emulsifiers or dispersing agents include polyethylene phenol ethers, blends of polyalcohol carboxylic acid esters, oil soluble sulfonates and siloxaneoxyalkylene block copolymers. The preferred emulsifiers for the purposes of the present invention are the siloxaneoxyalkylene block copolymers of the general formula

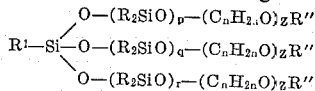

where R, $R^1$ and R" are $C_{1-8}$ alkyl radicals; p, q and r ar each 2 to 15 and —$(C_nH_{2n}O)_Z$— is a polyoxyalkylene block which is preferably a polyoxyethylene-polyoxypropylene block containing from 10 to 50 of each oxyalkylene unit; products of this type are covered in U.S.P. 2,834,748 and their use in polyurethane foam preparation is the subject of Belgian P. 582,362-3. Such siloxaneoxyalkylene block copolymers are commercially available; one of the commercial types is "Silicone L-520" referred to in the samples as "silicone emulsifier," in which the general formula above R=$CH_3$, R'=$C_2H_5$, R"=$C_4H_9$, p=q=r=7, and the block —$(C_nH_{2n}O)_Z$— is a polyoxyethylene-polyoxypropylene block containing 50 oxyethylene and 50 oxypropylene units.

The more detailed practice of the invention is illustrated in the following examples, in which parts and percentages are given by weight unless otherwise specified.

EXAMPLE I

A. Preparation of polyisocyanate compositions

The apparatus used in this example comprised an autoclave surmounted by a reflux condenser communicating with an effluent gas manifold leading to an absorber. It was provided with an inlet line for charging reactants, an agitator, a jacket for circulation of heating and cooling media, and instruments for measuring pressure and temperature. A pressure relief valve was located in the effluent gas line downstream from the reflux condenser.

The tolylene diamine reactant used in this example contained approximately 77.2% of 2,4-isomer, 19.3% of 2,6-isomer, 1.0% of 3,4-isomer, 0.9% of 2,3-isomer and 0.6% of 2,5-isomer.

Phosgene (560 parts) and monochlorobenzene (120 parts) were charged to the autoclave and cooled to −10° C. A hot (90° C.) solution of metatolylenediamine (244 parts) in 880 parts monochlorobenzene was prepared in a mixer and charged to the autoclave at such a rate that the mixing temperature did not exceed 20° C. Reactor charge composition was: amine/solvent weight ratio, 0.244; phosgene/amine mol ratio, 2.8.

The autoclave was closed and slowly heated. Phosgenation became vigorous at about 45° C. as evidenced by a presure kick from HCl evolution. After the temperature rose to 80° C., the pressure valve was opened and manipulated so as to vent HCl at a rate sufficient to keep the pressure below about 7 atmospheres. Heating continued at a rate controlled to avoid surging during HCl evolution. As the reaction neared completion (evidenced by a decline in HCl evolution) the temperature was raised to 136° C. to complete the phosgenation of small amounts of unreacted amine hydrochloride. When phosgenation was complete, HCl stopped coming off and it was necessary to close the valve to keep pressure in the autoclave. Heating was discontinued and the autoclave was vented to atmospheric pressure.

The reaction mass was distilled at atmospheric pressure to remove HCl and phosgene together with about 100 parts of solvent. Solvent was then distilled off at 25 mm. Hg pressure and kettle temperatures up to 165° C. The distilland was cooled to 120° C. and then distilled at 10–12 mm. Hg to separate about 70 parts of tolylene diisocyanate from 280 parts concentrated distilland.

B. *Properties of polyisocyanate composition*

The concentrated distilland had the following properties:

| | |
|---|---|
| Amine equivalent | 106.3 |
| Infrared absorbance at 5.85 microns | 0.312 |
| Recoverable tolylene diisocyanates, gas. chromatograph percent | 74 |
| Viscosity at 25° C. cps | 61 |
| Density at 25° C. g./cc. | 1.26 |

Data on the composition of the solute fraction of this product are given above under "Chemical Nature of Polyisocyanate Composition."

C. *Preparation and properties of foam*

A "premix" was prepared by mixing the following:

| | Parts |
|---|---|
| "Actol 52–460," a polyoxypropylene polyol having a hydroxyl number of about 460, acid number below 0.1 and water content below 0.1 wt. percent | 100 |
| Dibutyl tin dilaurate | 0.37 |
| Dimethylethanolamine | 1.0 |
| "Dow-Corning 113," a silicon glycol copolymer used to stabilize the foam | 1.5 |
| "Genetron 11," trichloromonofluoromethane, a blowing agent | 38 |

A foam making machine equipped with a Martin-Sweets mixing head operating at 5500 r.p.m. rotor speed was continuously charged with separate streams of (1) premix, flowing at a rate of 12 lbs./minute, temperature of 73° F., and (2) above-described polyisocyanate composition flowing at a rate of 7.9 lbs./minute, temperature of 72° F. The charge contained 83.2 parts polyisocyanate composition per 100 parts polyether polyol; overall NCO/OH ratio of the reactants was 1.03.

A sample of foam mixture collected in a tub remained fluid for 18 seconds, gelled after 68 seconds, expanded to maximum volume after 2 minutes and 23 seconds, became tack-free after 3 minutes and 23 seconds and became tough after 6½ minutes. It had a density of 1.81 lbs./cu./foot.

Another sample of foam mixture was discharged into a heated (105° F.) aluminum mold to prepare a test panel 2' x 2' x 1¾" in dimensions. The resultant foam had a density of 2.0 lbs./cu./ft.; a cell structure of about 96.9% closed cells; a compressive strength of 18.5 p.s.i. at yield point and 26.5 p.s.i. at 10% deflection and a thermal conductivity, as determined by the thermal conductivity probe method (Pittsburgh Corning), "K factor" at 80° F. of 0.134 B.t.u./inch/hr./sq. ft./° F. The K factor rose slightly to 0.138 after aging for 10 days at 140° F.

Results of dimensional stability tests are set forth in the following table:

TEST CONDITION

| | Percent Elongation | | |
|---|---|---|---|
| | Height | Length | Width |
| 24 hrs. at 70° C | 0.4 | 0 | 0.2 |
| 24 hrs. at 110° C | 2.1 | 2.4 | 0.7 |
| 24 hrs. at −30° C | 0.2 | 0 | 0.2 |
| At 100% Relative Humidity: | | | |
| 3 days at 38° C | 1.5 | 1.0 | 3.6 |
| 1 day at 70° C | 1.8 | 2.0 | 0.8 |

EXAMPLE II

The polyisocyanate composition used in this example was prepared in a manner similar to that of Example I except the phosgene/amine ratio of the reactor charge was 2.3 and the final distillation operation was terminated when the concentrated distilland had an amine equivalent of 103.5 and a volatile tolylene diisocyanate content of about 75%.

A premix was prepared by mixing the following components.

| | Parts |
|---|---|
| Polyether triol ("Niax Triol LK–380," a mixture of polyethers having a hydroxyl number of 375–380, an acid number less than 1 and a water content under 1%) | 160 |
| Silicone emulsifier ("Silicone L–520") | 1.5 |
| Organo-tin catalyst (Stabilizer "D–22," dibutyl tin dilaurate) | 1.2 |
| Tetra(hydroxypropyl)ethylene diamine ("Quadrol") | 15 |
| Blowing agent, trichloromonofluoromethane ("Genetron 11") | 47 |

The polyisocyanate composition (137 parts was cooled to 15° C. and added to the cool (20° C.) premix. The mixture was agitated for 35 seconds, allowed to expand to maximum volume and stand at room temperature for 16 hours.

The resultant foam had a density of 1.7 lbs./cu. ft. cell structure of about 90% closed cells, a compressive strength of 23.5 p.s.i. at yield point and a thermal conductivity, as determined by the thermal conductivity probe method (Pittsburgh Corning), K factor at 75° F. of about 0.11 B.t.u.-inch/hr.-sq. ft.-F. Dimensional stability tests gave the following results.

Test conditions: Percent volume expansion

| | |
|---|---|
| 24 hrs. at 70° C. | No change |
| 24 hrs. at 110° C. | 8 |
| 24 hrs. at 0° C. | 1 |
| At 90–100% relative humidity: | |
| 3 days at 50° C. | 2.6 |
| 3 days at 70° C. | 3.6 |

For purposes of comparison another foam was made by the same procedure except that a tolylene diisocyanate mixture containing 80% 2,4-isomer and 20% 2,6-isomer was substituted for the polyisocyanate composition. The resulting foam had unsatisfactory dimensional stability.

EXAMPLE III

The polyisocyanate composition used in this example was similar to that used in Example 2 and had an amine equivalent of 105.

A "premix" containing three different polyether polyol components was prepared from the following:

| | Parts |
|---|---|
| Polyether ("Voranol RN-600," condensation product of propylene oxide with sucrose, hydroxyl number of about 600 and a water content under 1%) | 90 |
| Polyether ("E.T. 390," a polyether, the condensation product of propylene oxide with polyol initiator, having a hydroxyl number of about 405 and water content under 1%) | 20 |
| Silicone emulsifier ("Silicone L-520") | 1 |
| Dimethylethanolamine | 1 |
| Basic polyether ("Niax Pentol LA-700," condensation product of propylene oxide with di-(ethylenediamine) having a hydroxyl number about 700) | 10 |
| Organo-tin catalyst (dibutyl tin dilaurate, Stabilizer "D-22") | 1 |
| Blowing agent, trichloromonofluoro-methane ("Genetron 11") | 50 |

The polyisocyanate composition (137 parts) was cooled to 15° C. and added to the cool (20° C.) premix. The reaction mixture was stirred for 35 seconds. The foam expanded to full volume in an additional 35 seconds and was allowed to stand for 16 hours.

The foam had a density of 1.6 lbs./cu. ft. Dimensional stability tests gave the following results.

Test conditions: Volume change
24 hours at −30° C. _____ No change
24 hours at 70° C. _____ percent shrinkage__ 1.5
24 hours at 110° C. _____do____ 2
At 90–100% relative humidity:
24 hours at 70° C. __percent expansion__ 1.5
3 days at 100° F. _____do____ 2

EXAMPLE IV

The polyisocyanate composition used in this example was substantially the same as that used in Example III. A premix was prepared from the following:

| | Parts |
|---|---|
| Polyether hexitol ("G-2410," a condensation product of propylene oxide with sorbitol, having a hydroxyl number of 500 and a water content under 1%) | 100 |
| Silicone emulsifier ("Silicone L-520") | 1 |
| Organo-tin catalyst (dibutyl tin dilaurate, Stabilizer "D-22") | 1.2 |
| Dimethylethanolamine | 0.5 |
| Blowing agent, trichloromonofluoromethane ("Genetron 11") | 35 |

The premix was cooled to 20° C. before addition of 95 parts of cool (15° C.) polyisocyanate composition. The foam was allowed to stand for 16 hours after expanding to full volume. Density was 1.7 lbs./cu. ft. Dimensional stability data were as follows.

Test conditions: Volume expansions, percent
24 hours at 0° C. _____ 0.5
24 hours at 70° C. _____ [1] 1.9
24 hours at 110° C. _____ [1] 18.4
At 90–100% relative humidity:
3 days at 50° C. _____ [1] 5.6
3 days at 70° C. _____ [1] 6.3

[1] Average of three tests.

Although certain preferred embodiments of the invention have been disclosed for purpose of illustration, it will be evident that various changes and modifications may be made therein without departing from the scope and spirit of the invention.

I claim:

1. A tolylene diamine phosgenation product consisting essentially of a tolylene diisocyanate solution of congeneric non-volatile polyisocyanate solutes, said solution being characterized by the following combination of parameters:
    (1) a weight concentration of hexane insoluble congeneric solute between 20 and 55%;
    (2) an infrared absorption spectrum including absorbance maxima in the regions 4.3 to 4.5 microns, 5.8 to 5.9 microns, and 5.95 to 6.05 microns, which define an absorbance pattern characteristic of said solute;
    (3) a molar concentration of congeneric solute sufficient to impart to said spectrum, at the absorbance maximum between 5.8 and 5.9 microns, an absorbance between 0.2 and 0.5;
    (4) an amine equivalent between 98 and 120;
    (5) a recoverable tolylene diisocyanate content, as measured in a gas chromatograph, between about 55 and 85 weight percent;
    (6) a viscosity between 20 and 10,000 cps. at 25° C.;
    (7) a density between 1.23 and 1.29 at 25° C.

2. A product of claim 1, containing from 10 to 40 weight percent of non-volatile solutes which precipitate out when said product is diluted with hexane-toluene mixture, said precipitated solute being characterized by the following properties:
thermal stability below 130° C.
average molecular weight above 640
average amine equivalent above 180.

3. A process for making a polyisocyanate composition comprising the following steps:
    (1) mixing tolylene diamine, phosgene, and solvent at between about −20° C. and 100° C. in such proportions that the molar ratio of phosgene to tolylene diamine is at least 2.2 and the weight ratio of tolylene diamine to solvent is between 0.05 and 0.50, said solvent having a relative volatility vs. tolylene diisocyanate at 140° C. of between 4 and 100;
    (2) heating the reaction mixture through a temperature range between the mixing temperature and a maximum temperature between 100° and 200° C. at superatmospheric pressure sufficient to maintain a stoichiometric excess of phosgene in the reaction medium until the phosgenation reaction is substantially complete;
    (3) separating phosgene and hydrogen chloride from the resulting solution of phosgenate;
    (4) distilling solvent and tolylene diisocyanate from said solution of phosgenate until the concentrated distilland is a tolylene diisocyanate solution of congeneric non-volatile solute defined by claim 1;
    (5) terminating the distillation and recovering the concentrated distilland.

References Cited by the Examiner

UNITED STATES PATENTS 3,215,652  11/1965  Kaplan _____ 260—453

CHARLES B. PARKER, *Primary Examiner.*

RICHARD L. RAYMOND, *Assistant Examiner.*